United States Patent [19]

Frances et al.

[11] Patent Number: 5,021,601
[45] Date of Patent: Jun. 4, 1991

[54] NOVEL POLYORGANOSILOXANES COMPRISING PROPANALDEHYDE FUNCTIONAL GROUPS

[75] Inventors: Jean-Marc Frances, Villeurbanne; Francois Metz, Lyon, both of France

[73] Assignee: Rhone-Poulenc Chimie, Courbevoie, France

[21] Appl. No.: 402,768

[22] Filed: Sep. 5, 1989

[30] Foreign Application Priority Data

Sep. 5, 1988 [FR] France ................... 88 11768

[51] Int. Cl.$^5$ ................. C07F 7/08; C08G 77/06; C08G 77/20
[52] U.S. Cl. ..................... 556/436; 528/14; 528/32
[58] Field of Search .............. 556/436; 528/14

[56] References Cited

U.S. PATENT DOCUMENTS

| | | | |
|---|---|---|---|
| 2,588,083 | 3/1952 | Burkhard et al. | 556/436 |
| 2,803,637 | 8/1957 | Speier | 556/436 |
| 4,424,392 | 1/1984 | Petty | 556/436 |

FOREIGN PATENT DOCUMENTS

| | | | |
|---|---|---|---|
| A-0089690 | 9/1983 | European Pat. Off. | |
| A-0183280 | 6/1986 | European Pat. Off. | |
| A-3632869 | 3/1988 | Fed. Rep. of Germany | 556/436 |

*Primary Examiner*—Paul F. Shaver
*Attorney, Agent, or Firm*—Burns, Doane, Swecker & Mathis

[57] ABSTRACT

Novel linear or branched $O_2$-curable polyorganosiloxanes containing propanaldehyde functional groups and at least three recurring siloxyl units per molecule, at least one unit of which corresponds to the general formula:

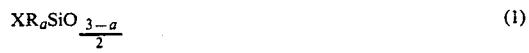

(1)

in which X is the radical $-CH_2-CH_2CHO$ or the radical

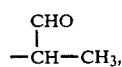

and R is a monovalent hydrocarbon residue containing from 1 to 12 carbon atoms, are prepared by hydroformylation of the corresponding polyorganosiloxane in an organic phase by means of a catalyst system which is soluble in the organic phase but insoluble in aqueous phase, such catalyst system including a rhodium/sulfonated or carboxylated triarylphospine salt complex.

8 Claims, No Drawings

NOVEL POLYORGANOSILOXANES COMPRISING PROPANALDEHYDE FUNCTIONAL GROUPS

BACKGROUND OF THE INVENTION

1. Field of the Invention

The present invention relates to novel polyorganosiloxanes comprising propanaldehyde functional groups and to a process for the preparation of such novel polyorganosiloxanes by hydroformylation.

2. Description of the Prior Art:

The preparation of a silane containing a propanaldehyde functional group, namely, of the type ≡Si—CH$_2$—CH$_2$—CHO or

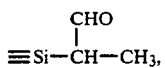

by hydroformylation of the corresponding vinylsilane utilizing various catalysts has already been described in the scientific literature.

Thus (i) in *J. Oro. Chem.*, 17, p. 1107-1109, the hydroformylation catalyst is based on cobalt;

(ii) in the *Journal of General Chemistry of the USSR* (translation of *Zhurnal Obshchei Khimii*, p. 1395-1397 of 20 Dec. 1977), vol. 47, number 7, part 1 (July 1977), the catalyst is rhodium-based; and (iii) in EP-A-89,690, the catalyst is preferably rhodium deposited on alumina.

However, insofar as the present applicants are aware, the chemical literature does not describe the production of polyorganopolysiloxanes containing a propanaldehyde functional group by a hydroformylation process, or by any other preparative process. Only the disiloxane of the formula:

(OHCCH$_2$CH$_2$)(CH$_3$)$_2$Si—O—Si(CH$_3$)$_2$(CH$_2$CH$_2$CHO)

is described, in *J. Org. Chem.*, vol. 35, number 12, p. 4180-4183 (1970), and this is prepared by a process entailing the hydrolysis of a disiloxane precursor.

Furthermore, also insofar as the present applicants are aware, no description exists in the prior art of a vinylsilane hydroformylation process being carried out in the presence of a catalyst system containing rhodium and sulfonated or carboxylated triarylphosphine salts.

Such a hydroformylation process, applied to organic olefins, is described in FR-A-2,314,910 in the case where the phosphine salts are water-soluble, and in U.S. Pat. No. 4,740,626 in the case where the phosphine salts are soluble in organic solvents, insoluble in water, but soluble in an aqueous solution of a base.

In FR-A-2,314,910, the hydroformylation reaction is described as being carried out in aqueous phase. In U.S. Pat. No. 4,740,626, it is described as being carried out in an organic phase.

SUMMARY OF THE INVENTION

Accordingly, a major object of the present invention is the provision of novel polyorganosiloxanes comprising propanaldehyde functional groups and containing at least three recurring siloxyl units per molecule.

Another object of the present invention is the provision of novel polyorganosiloxanes, in particular linear or cyclic diorganopolysiloxanes comprising propanaldehyde functional groups and stable in storage in the absence of atmospheric oxygen, but capable of being crosslinked into elastomeric state by contact with the oxygen in air.

Yet another object of this invention is the provision of a process for the preparation, by hydroformylation, of novel polyorganosiloxanes comprising propanaldehyde functional groups from the corresponding polyorganovinylsiloxanes, such process being capable of producing the desired final products with a good degree of conversion of the vinyl groups into propanaldehyde groups, and wherein such desired final products are easily separated from the catalyst system.

Briefly, the present invention features novel polyorganosiloxanes comprising at least three recurring siloxyl units per molecule, at least one unit of which corresponds to the general formula:

$$XR_aSiO_{\frac{3-a}{2}} \qquad (1)$$

in which X is one of the radicals —CH$_2$—CH$_2$—CHO and

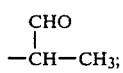

the radicals R, which may be identical or different, are each a phenyl or a 3,3,3-trifluoropropyl radical, or an alkyl radical containing from 1 to 12 carbon atoms; and a is 0, 1 or 2.

DETAILED DESCRIPTION OF THE PREFERRED EMBODIMENTS OF THE INVENTION

More particularly according to the present invention, methyl, ethyl, propyl, hexyl and dodecyl radicals are exemplary of the radicals R. At least 50% of the number of radicals R are preferably methyl radicals.

The other siloxyl units preferably correspond to the formula:

$$R'_xSiO_{\frac{4-x}{2}} \qquad 1''$$

in which the radicals R', which may be identical or different, are each R, vinyl, hydroxyl or alkoxy radicals containing from 1 to 3 carbon atoms; and x is 0, 1, 2 or 3.

R' is preferably a methyl, phenyl or vinyl radical, at least 50% of the number of the radicals R' being methyl radicals.

The polyorganosiloxanes according to the invention may have a linear, cyclic or branched structure.

The present invention especially features random, sequential or block diorganopolysiloxane copolymers comprising propanaldehyde functional groups and having the formula:

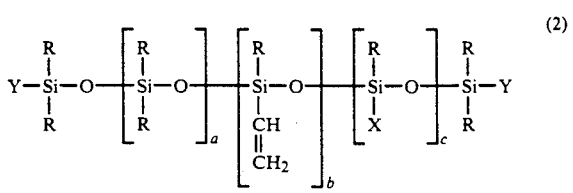

in which X and R, which may be identical or different, are as defined above; the radicals Y, which may be identical or different, are the radicals R or X; a is an integer ranging from 0 to 1,000, inclusive; b is an integer ranging from 0 to 50, inclusive; c is an integer ranging from 0 to 100, inclusive; with the proviso that, if c is 0, at least one of the two radicals Y is X, and a+b+c is equal to at least 1; and those of the formula:

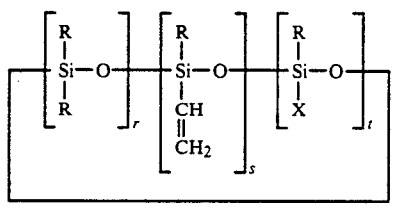
(3)

in which R and X are as defined above; r is an integer ranging from 0 to 9, inclusive; s is an integer ranging from to 9, inclusive; and t is an integer ranging from 1 to 10, inclusive.

In the case of the polymers of formulae (1), (2) and (3), it is desirable that more than 80% of the number of radicals X be radicals of the formula $-CH_2-CH_2-CHO$.

Indeed, the group $\equiv Si-CH(CHO)-CH_3$ is capable of isomerizing to an enoxy group $\equiv Si-O-CH=CH-CH_3$.

The polymers of formula (2) are preferably those in which:
- a is an integer ranging from 1 to 400, inclusive;
- b is an integer ranging from 0 to 20, inclusive;
- c is an integer ranging from 2 to 60, inclusive; and
- R is a methyl or phenyl radical, at least 50% of the number of radicals R being methyl radicals.

The polymers of formula (3) are preferably those in which:
- r is an integer ranging from 0 to 5, inclusive;
- s is an integer ranging from 0 to 5, inclusive;
- t is an integer ranging from 1 to 6, inclusive;
- r+s+t ranges from 3 to 6, inclusive; and
- R is a methyl or phenyl radical, at least 50% of the number of radicals R being methyl radicals.

The polyorganosiloxanes according to the invention may be prepared by hydroformylation in a single-phase medium, the initial polyorganovinylsiloxane preferably being in solution in an organic solvent. This process, employing conventional hydroformylation catalysts, generally produces the desired oils. However, when the catalyst employed is not supported, then the problem of rhodium recovery arises. The process described in the above-mentioned FR-A-2,314,910 does not result in production of the desired polymer.

According to the present invention, it has been demonstrated that the hydroformylation process of U.S. Pat. No. 4,740,626 was suitable, in particular, for the preparation of polyorganosiloxanes comprising propanaldehyde functional groups.

The present invention, therefore, also features a process for the preparation of polyorganosiloxanes comprising at least three siloxyl groups, at least one siloxyl group of which corresponds to the formula (1) above, wherein at least partial reaction of a polyorganosiloxane containing at least three siloxyl units per molecule, at least one siloxyl unit of which corresponds to the general formula:

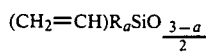
(1')

in which R and a are as defined above, is carried out in an organic solvent, with hydrogen and carbon monoxide in the presence of a catalyst system containing rhodium and sulfonated or carboxylated triarylphosphine salts which are soluble in organic solvents and insoluble in water. The homogeneous mixture obtained is then contacted with an aqueous solution of a base with a view towards separating an organic phase containing the organopolysiloxane comprising the propanaldehyde group and an aqueous phase containing the rhodium-based catalyst.

The diorganopolysiloxanes of formulae (2) and (3) are respectively prepared by this same process, the beginning polyorganovinylsiloxane having the formula:

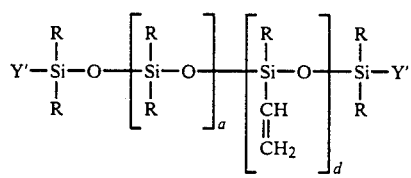
(2')

in which R and a are as defined above; d is equal to b+c; and Y' is a vinyl radical or a radical R; with the proviso that, when d=0, at least one of the two radicals Y' is a vinyl radical; or having the formula:

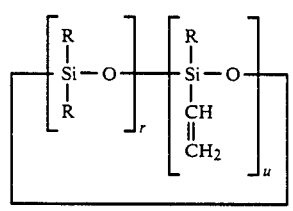
(3')

in which R is as defined above and u is equal to s+t, r+u ranging from 3 to 10, inclusive.

The phosphine salts preferably contain $[NR''_2H_2]^+$ and/or $[NR''_3H]^+$ as cations, with R'' being an alkyl radical containing from 4 to 12 carbon atoms, an aryl radical, or a cycloalkyl radical containing from 6 to 12 carbon atoms.

The hydroformylation reaction may be carried out at a temperature ranging from 80.C to 180 C, at a pressure ranging from 10 to 35 bars.

The amount of rhodium employed generally ranges from 5 to 100 ppm, based on the initial organopolysiloxane.

The process and the catalyst system are described in detail in U.S. Pat. No. 4,740,626 noted above.

The preferred phosphine is the trisulfonated triphenylphosphine of the formula:

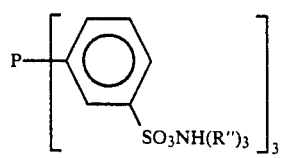

The preferred rhodium complex used in combination with a molar excess of this phosphine is the dinuclear rhodium complex of the formula:

[Rh(μ-SZ)(CO)₂]₂ radicals Z, which may be identical or different, are each a monovalent hydrocarbon radical, in particular an alkyl radical having from 1 to 6 carbon atoms, in particular the tert-butyl radical. The process for preparing such complex is described in EP-A-179,004 noted above.

The initial polyorganovinylsiloxane is preferably in solution in an organic solvent such as toluene.

The polymers according to the invention are stable in storage in the absence of oxygen and crosslink into an elastomer merely by being exposed to air/oxygen, either in the absence or presence of a metallic curing catalyst. They can therefore be used for coating various substrates with an elastomeric layer, the thickness of which can vary from 0.1 to 5 mm. They can thus be used for encapsulating electronic circuits.

The polymers according to the present invention can also be used for the preparation of compositions which are stable in storage, especially comprising fillers and catalysts, the said compositions being converted into elastomers by crosslinking due to the action of air/oxygen.

These fillers can be in the form of very finely divided products whose mean particle diameter is less than 0.1 micrometer. These fillers include pyrogenic silicas and precipitated silicas; their BET specific surface area is generally greater than 40 m²/g.

These fillers may also be in the form of more coarsely divided products, with a mean particle diameter greater than 0.1 micrometer. Exemplary of such fillers are ground quartz, diatomaceous silicas, calcium carbonate, calcined clay, titanium dioxide of the rutile type, iron, zinc, chromium, zirconium and magnesium oxides, various forms of alumina (hydrated or otherwise), boron nitride, lithopone, barium metaborate, barium sulfate and ballotini; their specific surface area is generally less than 30 m²/g.

These fillers may have been surface-modified by treatment with the various organosilicon compounds usually employed for this purpose. Thus, such organosilicon compounds may be organochlorosilanes, diorganocyclopolysiloxanes, hexaorganodisiloxanes, hexaorganodisilazanes or diorganocyclopolysiloxanes (French Patents Nos. 1,126,884, 1,136,885 and 1,236,505; British Patent No. 1,024,234). In most cases, the treated fillers contain from 3% to 30% of their weight of organosilicon compounds.

The fillers may comprise a mixture of several types of fillers of different particle size. Thus, for example, they may comprise 30% to 70% of finely divided silicas having a BET specific surface area greater than 40 m²/g and 70% to 30% of more coarsely divided silicas having a specific surface area of less than 30 m²/g.

These fillers are generally incorporated in a proportion of 0 to 250 parts, preferably of 5 to 150 parts, per 100 parts (by weight) of polyorganosiloxane comprising propanaldehyde functional groups.

The catalysts employed may be salts of carboxylic acids and of metals such as, for example, barium, bismuth, calcium, cerium, chromium, copper, iron, lead, magnesium, manganese, molybdenum, nickel, cobalt, the rare earths, tin, zinc or zirconium. Organic ligands with these metals may also be employed, such as, for example, the acetylacetonates of these metals. The preferred catalysts are cobalt, iron and manganese carboxylates. The amount of catalyst employed is generally less than 1 part (by weight) per 100 parts of the polysiloxane comprising propanaldehyde functional groups.

In order to further illustrate the present invention and the advantages thereof, the following specific examples are given, it being understood that same are intended only as illustrative and in nowise limitative.

EXAMPLE 1

Preparation of the catalyst system (1.a) Preparation of the ligand of the formula

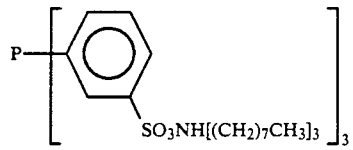

5.9 g of triphenylphosphine trisulfonated in the meta position, containing 9.26 meq (milliequivalent) of P(III), were mixed with stirring and under a nitrogen atmosphere with 19 g of water and 1.2 g of H₂SO₄, containing 25 meq H⁺.

The above mixture was stirred magnetically for 30 minutes and then 31.3 g of toluene and 13.5 g of tri-noctylamine were added.

The mixture was maintained vigorously stirred for 60 minutes at ambient temperature (20.C) and under nitrogen and the upper organic phase (35 g) and the aqueous phase (23.72 g) were allowed to separate.

The organic phase was retained; it contained 4.6 meq P(III) and it included 13.4 meq of trioctylamine attached or not attached to the phosphorus and 27 g of toluene.

The phosphorus content was determined by iodometry.

(1.b.) Preparation of the catalyst systems:

These were prepared simply by mixing variable quantities Q, in mg, of a dinuclear "butterfly" rhodium complex of the formula:

[Rh(μ-StBu)(CO)₂]₂ which is the di(μ-sulfo-tert-butyl)tetracarbonyldirhodium prepared by the process described in *J. Oroanomet. Chem.*, 73, C36 (1974), with variable quantities Q', in g, of the toluene solution of the ligand produced in Example (1.a.) above.

Three catalyst systems S1, S2 and S4 were thus prepared, whose characteristics Q, Q', rhodium content in milligram-atoms (mg-at.), P(III) content in meq and P/Rh molar ratio are reported in Table 1 below.

Three catalyst systems S3, S5 and S6 were prepared in a similar manner, the quantities of each of the constituents being, however, modified.

The characteristics of these systems are also reported in Table I below.

TABLE I

| S:catalyst system | Q (mg) | Rh mg-at. | Q' (g) | P (III) meq | P/Rh |
|---|---|---|---|---|---|
| S₁ | 23.30 | 9.40 10⁻² | 3.85 | 0.5 | 5.3 |
| S₂ | 4.00 | 1.60 10⁻² | 4.6 | 0.6 | 37 |

TABLE I-continued

| S:catalyst system | Q (mg) | Rh mg-at. | Q' (g) | P (III) meq | P/Rh |
|---|---|---|---|---|---|
| $S_3$ | 4.10 | $1.66\ 10^{-2}$ | 3.5 | 2.3 | 140 |
| $S_4$ | 3.00 | $1.21\ 10^{-2}$ | 3.85 | 0.5 | 41 |
| $S_5$ | 48.00 | $1.93\ 10^{-2}$ | 15 | 1.57 | 8 |
| $S_6$ | 3.72 | $1.50\ 10^{-2}$ | 22.45 | 1.5 | 100 |

EXAMPLES 2 TO 7

Hydroformylation of organovinylpolysiloxane

Operatinc procedure

A catalyst system S and a polyorganovinylsiloxne oil 0 defined by its weight $w_1$, its vinyl group content $C_{vi}$ in milliequivalents and a certain quantity $w_2$ (in g) of toluene were introduced into a 500-cm$^3$ stainless steel autoclave fitted with a heating system.

The autoclave was filled with nitrogen and, at a temperature $\Theta$ of from 100° to 110° C., a $H_2/CO$ mixture (molar ratio 1/1) was introduced at a constant pressure of 21 bars.

A system of pressure sensors enabled the $H_2/CO$ gas consumption to be monitored in a 500-cm$^3$ stock pressurized to 100 bars before the reaction.

The reaction was optionally terminated after a calculated introduction of $H_2/CO$ gases corresponding to the desired degree of conversion DC (in %) of the vinyl groups introduced, by isolating the autoclave from the feed system and by cooling the autoclave abruptly. The reaction time t (in min) was measured.

The isolated autoclave was purged using a gas removal system. The reaction mixture obtained was treated with 100 g of alkaline water containing 0.3% of NaOH in a one-liter flask for 60 minutes at 20° C. with magnetic stirring.

The emulsion obtained was separated by centrifuging for 20 minutes at 7,000 revolutions/min.

The upper organic phase was clear and colorless. The aqueous phase containing the rhodium was colored yellow.

Toluene was evaporated off from the organic phase to isolate the silicone oil, in which the vinyl functional groups were determined, together with the propanaldehyde functional groups by reaction with $NH_2OH/HCl$ in the presence of triethanolamine.

The following were determined from $^1H$ and $^{29}Si$ NMR and infrared spectra: the degree of conversion of the vinyl units (DC in %), the degree of conversion of the vinyl units at the end of a polymer chain ($DC_1$ in %), the degree of conversion of the vinyl units in the polymer chain ($DC_2$ in the yield of linear propanaldehyde groups obtained at the 1 end of a polymer chain ($RYl_1$ in %), the yield of linear propanaldehyde obtained in the polymer chain ($RYl_2$ in %), the yield of branched propanaldehyde in the polymer chain ($RYb_2$) and at the end of a polymer chain ($RYb_1$), isomerized to enoxysilane.

The number of rotations A, which is equal to the number of moles of reactants converted per gram-atom of rhodium and per minute of reaction, as well as the molar ratio Vi/Rh, were determined.

The oils 0 employed had the following average formulae (Vi = vinyl, Me = methyl):

$O_1$ : (Examples 2 and 3):
$ViMe_2SiO(Me_2SiO)_{153}(MeViSiO)_{10}SiMe_2Vi$
$O_2$ : (Example 4)
$Me_3SiO(Me_2SiO)_{238}(MeViSiO)_{46}SiMe_3$
$O_3$ : (Examples 5 to 7):
$Me_2ViSiO(Me_2SiO)_{22.3}SiMe_2Vi$ The operating conditions and the results obtained are reported, respectively, in Tables 2 and 3 below.

In addition, after treatment of the reaction mixture with alkaline water, the residual quantity of rhodium was determined by atomic absorption determination.

In Examples 2 to 7,.less than 1% by weight of residual rhodium was found relative to the weight of rhodium initially introduced.

TABLE II

| EXAMPLES | S | O | $w_1$ (g) | $C_{vi}$ | $w_2$ | Vi/Rh | $\Theta$ (°C.) |
|---|---|---|---|---|---|---|---|
| 2 | $S_1$ | 01 | 159.3 | 147.5 | 117.0 | 1,568 | 110 |
| 3 | $S_2$ | 01 | 160.0 | 148.0 | 110.0 | 9,174 | 105 |
| 4 | $S_3$ | 02 | 71.9 | 106.5 | 182.3 | 6,415 | 110 |
| 5 | $S_4$ | 03 | 122.2 | 126.7 | 67.0 | 10,471 | 100 |
| 6 | $S_5$ | 03 | 100.2 | 105.0 | 170.0 | 542 | 100 |
| 7 | $S_6$ | 03 | 116.2 | 134.7 | 135.0 | 8,980 | 100 |

TABLE III

| EXAMPLES | DC | t (min) | A | $DC_1$ (%) | $RYl_1$ (%) | $RYb_1$ (%) | $RYl_2$ (%) | $RYb_2$ (%) | $DC_2$ (%) |
|---|---|---|---|---|---|---|---|---|---|
| 2 | 56 | 9 | 110 | 85 | 70 | — | 53 | 11 | 68 |
| 3 | 52 | 39 | 120 | 83 | 75 | — | 47 | 8 | 58 |
| 4 | 50 | 90 | 35 | — | — | — | 35 | 6 | 45 |
| 5 | 100 | 60 | — | 100 | 82 | 14 | — | — | — |
| 6 | 94 | 7 | 90 | 94 | 68 | 15 | — | — | — |
| 7 | 95 | 50 | 160 | 96 | 74 | 20 | — | — | — |

EXAMPLE 8

The oils produced in Examples 2, 3 and 4 were applied onto a substrate as a film having a thickness of 0.1 to 5 mm.

The films formed a smooth, transparent coating which was crosslinked in the presence of oxygen and without a catalyst.

A 2-mm thick film deposited onto an aluminum or stainless steel plate could be demolded after 72 hours.

$^{29}Si$ NMR spectrum analysis of the gel obtained by immersing the film in an organic solvent evidenced that the $RXSiO_{2/2}$ units were not converted into $RSiO_{3/2}$ units.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A polyorganosiloxane comprising a diorganopolysiloxane of the formula:

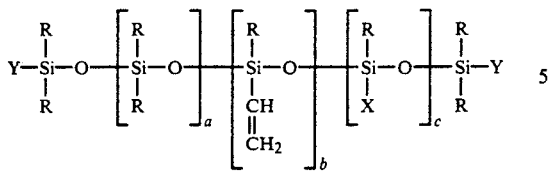

in which the radicals Y, which may be identical or different, are each a radical X; X is one of the radicals —CH₂—CH₂—CHO or

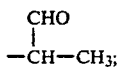

the radicals R, which may be identical or different, are each a phenyl or 3,3,3-trifluoropropyl radical or an alkyl radical containing from 1 to 12 carbon atoms; a is an integer ranging from 0 to 1,000; b is an integer ranging from 0 to 50; c is an integer ranging from 0 to 100; and a+b+c is equal to at least 1.

2. The polyorganopolysiloxane as defined by claim 1, wherein the radicals R, which may be identical or different, are each a methyl or phenyl radical, at least 50% of the number of radicals R being methyl radicals.

3. A process for the preparation of a polyorganopolysiloxane comprising at least three recurring siloxyl units per molecule, at least one of which having the general formula:

$$XR_aSiO_{\frac{3-a}{2}} \quad (1)$$

in which X is one of the radicals —CH₂—CH₂—CHO or

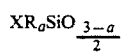

the radicals R, which may be identical or different, are each a phenyl or 3,3,3-trifluoropropyl radical or an alkyl radical containing from 1 to 12 carbon atoms; and a is 0, 1 or 2 comprising:

(a) at least partially reacting a polyorganosiloxane comprising at least three recurring siloxyl units per molecule, including at least one siloxyl unit having the general formula:

$$(CH_2=CH)R_aSiO_{\frac{3-a}{2}} \quad (1')$$

in an organic solvent, with hydrogen and carbon monoxide, in the presence of a catalyst system which comprises rhodium and sulfonated or carboxylated triarylphosphine salts which are soluble in organic solvents and insoluble in water; and (b) contacting the resulting homogeneous mixture with an aqueous solution of a base to permit separation of said mixture into an organic phase containing the organopolysiloxane comprising the propanaldehyde group and an aqueous phase comprising the rhodium-based catalyst.

4. The process as defined by claim 3, said starting material polyorganosiloxane having the formula:

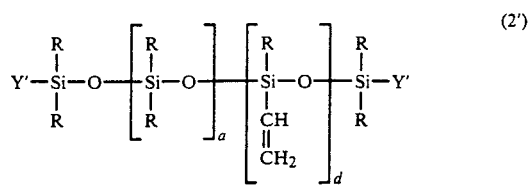

in which d is equal to b+c; and Y' is a vinyl radical or a radical R; with the proviso that, when d=0, at least one of the two radicals Y' is a vinyl radical wherein a, b, c, and d are as in the formula

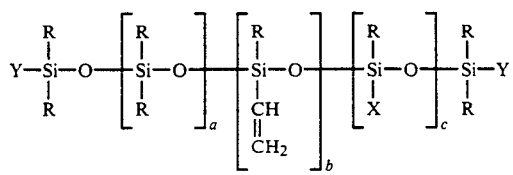

wherein R is as defined in claim 3, the Y groups which may be identical or different, are R or X, wherein X is as defined in claim 3, a is an integer ranging from 0 to 1000, b is an integer ranging from 0 to 50, and c is an integer ranging from 0 to 100 and a+b+c is equal to at least 1.

5. The process as defined by claim 3, said starting material polyorganosiloxane having the formula:

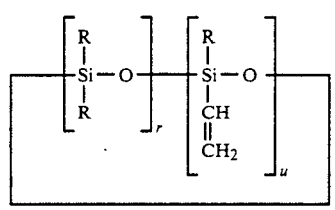

in which u is equal to s+t, with r+u ranging from 3 to 10 wherein r, s, t and u are as in the formula

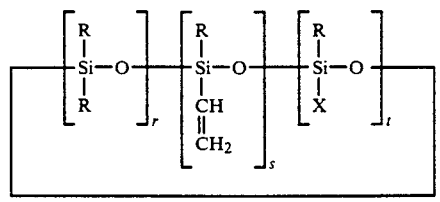

6. The process as defined by claim 3, said catalyst system comprising the combination of a dinuclear rhodium complex of the formula:

[Rh(μ−SZ)(CO)₂]₂ in which Z is a monovalent hydrocarbon radical, with a molar excess of a trisulfonated triphenylphosphine of the formula:

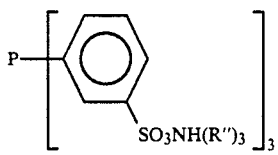

wherein R and X are as defined in claim 3 r is an integer ranging from 0 to 9, s is an integer ranging from 0 to 9, and t is an integer ranging from 1 to 10 in which R" is an alkyl radical containing from 4 to 12 carbon atoms, an aryl radical, or a cycloalkyl radical containing form 6 to 12 carbon atoms.

7. The polyorganosiloxane as defined by claim 1, in cured elastomeric state.

8. A shaped article comprising the polyorganosiloxane elastomer as defined by claim 7.

* * * * *